United States Patent
Kisra et al.

(10) Patent No.: US 12,129,755 B2
(45) Date of Patent: Oct. 29, 2024

(54) INFORMATION EXTRACTION FROM DAILY DRILLING REPORTS USING MACHINE LEARNING

(71) Applicant: Schlumberger Technology Corporation, Sugar Land, TX (US)

(72) Inventors: Mohamed Saad Kisra, Calgary (CA); Francisco Jose Gomez, Abingdon (GB); Karsten Fischer, Aachen (DE); Ivan Diaz Granados Pertuz, Abingdon (GB); Athithan Dharmaratnam, Abingdon (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 390 days.

(21) Appl. No.: 17/753,759

(22) PCT Filed: Sep. 14, 2020

(86) PCT No.: PCT/US2020/070538
§ 371 (c)(1),
(2) Date: Mar. 14, 2022

(87) PCT Pub. No.: WO2021/051141
PCT Pub. Date: Mar. 18, 2021

(65) Prior Publication Data
US 2022/0372866 A1    Nov. 24, 2022

Related U.S. Application Data

(60) Provisional application No. 62/899,997, filed on Sep. 13, 2019.

(51) Int. Cl.
*E21B 47/12* (2012.01)
*G06F 40/284* (2020.01)
*G06F 40/30* (2020.01)

(52) U.S. Cl.
CPC ............ *E21B 47/12* (2013.01); *G06F 40/284* (2020.01); *G06F 40/30* (2020.01); *E21B 2200/20* (2020.05); *E21B 2200/22* (2020.05)

(58) Field of Classification Search
CPC .......... E21B 47/12; E21B 47/00; E21B 41/00; E21B 2200/20; E21B 2200/22;
(Continued)

(56) References Cited

U.S. PATENT DOCUMENTS 9,836,449 B2 *  12/2017  Tong ...................... G06F 40/279
2018/0088252 A1 *  3/2018  Borrel .................... G01V 20/00
(Continued)

FOREIGN PATENT DOCUMENTS

WO    2016172038 A1    10/2016
WO    2017210379       12/2017
(Continued)

OTHER PUBLICATIONS

IS190842WOPCT_International Search Report_Written Opinion issued Dec. 8, 2020_11 pages.
(Continued)

*Primary Examiner* — Jeffrey P Aiello
(74) *Attorney, Agent, or Firm* — Jeffrey D. Frantz

(57) ABSTRACT

A system and method are provided for extracting information regarding a drill site including forming one or more documents having one or more raw comments regarding a well site. Raw data may be extracted from the one or more documents to produce extracted raw data. The extracted raw date may be pre-processed by removing ambiguity, artifacts, and/or formatting errors from the one or more raw comments to produce pre-processed data. Topics data may be extracted from the pre-processed data using a natural language processing (NLP) algorithm to produce extracted topics data. Measurement data may also be extracted from
(Continued)

the pre-processed data using the NLP algorithm to produce extracted measurement data. The extracted topics data and the extracted measurement data may be aggregated to form a set of discrete data points, such as calibration points, per comment to produce aggregated data and one more calibration points may be identified from the aggregated data. The results of the one or more calibration points may then be presented.

20 Claims, 4 Drawing Sheets

(58) Field of Classification Search
CPC .... G06F 40/284; G06F 40/30; G06F 18/2178; G06F 17/18; G06F 2218/00; G06N 3/044; G06N 3/045; G06N 3/088; G06N 3/047; G06N 3/126; G06N 3/02; G06N 3/042; G06N 3/0464; G06N 20/00; G06N 7/02; G06Q 10/04; G06Q 10/08; G06Q 10/063
USPC ........ 700/83, 108, 266, 90; 702/6, 188, 183, 702/84, 127, 181, 2, 9, 5, 30; 707/999.102, 708
See application file for complete search history.

(56) References Cited

U.S. PATENT DOCUMENTS

| | | | |
|---|---|---|---|
| 2018/0114158 A1* | 4/2018 | Foubert | E21B 44/00 |
| 2018/0240015 A1* | 8/2018 | Martin | G06N 3/045 |
| 2018/0247549 A1* | 8/2018 | Martin | G09B 19/00 |
| 2023/0060252 A1* | 3/2023 | Bly | G06F 18/285 |

FOREIGN PATENT DOCUMENTS

| | | | | |
|---|---|---|---|---|
| WO | WO-2017210379 A1 | * | 12/2017 | E21B 41/00 |
| WO | 2018111261 A1 | | 6/2018 | |

OTHER PUBLICATIONS

Hoffmann, J., Mao, Y., Wesley, A., Taylor A. 2017. Sequence Mining and Pattern Analysis in Drilling Reports with Deep Natural language Processing_7 pages.

Hogenboom, F., Frasincar, F., Kaymak, U. and de Jong, F. An Overview of Event Extraction from Text. Workshop on Detection, Representation, and Exploitation of Events in the Semantic Web (DeRIVE 2011) at Tenth International Semantic Web Conference (ISWC 2011). vol. 779 of CEUR Workshop Proceedings., CEURWS. org (2011) 48-57_10 pages.

Castineira, D., Toronyi, R.and Saleri, N. Machine Learning and Natural Language Processing for Automated Analysis of Drilling and Completion Data. Society of Petroleum Engineers. SPE Kingdom of Saudi Arabia Annual Technical Symposium and Exhibition, Apr. 23-26, 2018. Dammam, Saudi Arabia_16 pages.

Arumugam, S., Rajan, S., and Gupta, S. Augmented Test Mining for Daily Drilling Reports using Topic Modeling and Ontology. Apr. 23, 2017. Society of Petroleum Engineers_9 pages.

Arumugam, S., Gupta, S., Patra, B., Rajan, S., and Awarwal, S. Revealing Patterns within the Drilling Reports Using Test Mining Techniques for Efficient Knowledge Management. Sep. 13, 2016. Society of Petroleum Engineers_11 pages.

Chi Nhan Nguyen, Deep learning for information extraction, itemis blog, Nov. 19, 2018_19 pages.

Intuition Engineering, Deep learning for specific information extraction from unstructured texts. Jul. 21, 2018_14 pages.

Extended Search Report issued in European Patent Application No. 20862881.8 dated Aug. 7, 2023, 8 pages.

* cited by examiner

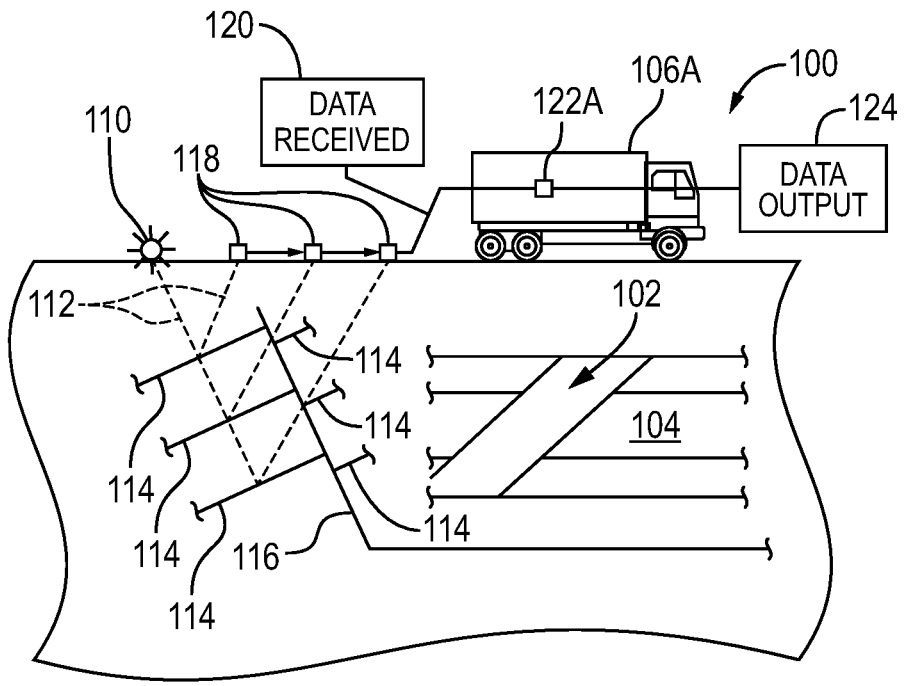
FIG. 1A
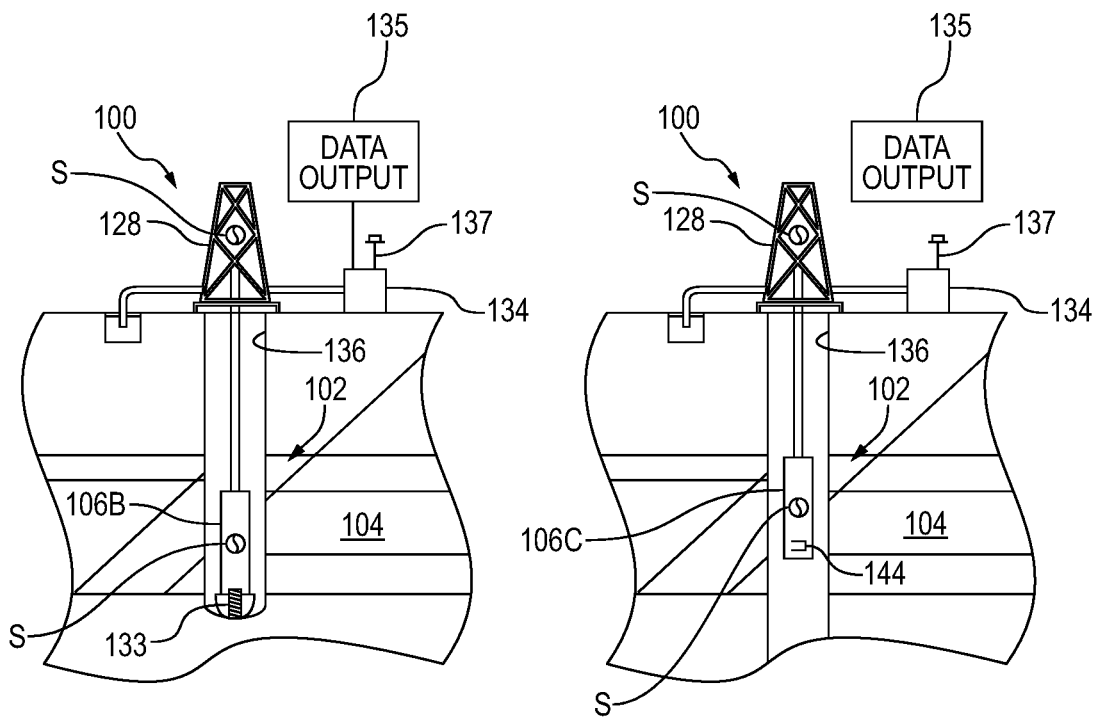
FIG. 1B  FIG. 1C

INFORMATION EXTRACTION FROM DAILY DRILLING REPORTS USING MACHINE LEARNING

CROSS-REFERENCE TO RELATED APPLICATION(S)

The present disclosure is a National Stage Entry of International Application No. PCT/US2020/070538, filed on Sep. 14, 2020, which claims priority from U.S. Provisional Appl. No. 62/899,997, filed on Sep. 13, 2019, entitled "Information Extraction from Daily Drilling Reports Using Machine Learning" herein incorporated by reference in its entirety.

BACKGROUND

Oil companies invest a large amount of money every year in acquiring different kinds of data to understand their reservoirs and produce hydrocarbons in a more efficient way. However, a significant part of the data may remain unused or may seldom be used to improve operational efficiency such as the kind associated with drilling and completion. One type of knowledge that is often not utilized is the large collection of daily activity reports where information is entered as free text.

In most companies, going through historical reports such as daily drilling reports (DDRs) to evaluate past problems and prepare for future operations is often called a "review." Today, this may be performed by engineers who manually screen the DDRs to extract relevant information for the specific problems they work on, which may be very tedious. In producing fields, the volume of reports to be screened or reviewed may generally be enormous. So due to time and cost constraints, reviews may often be limited to an arbitrarily reduced number of wells. In addition, reviews may solely focus on a specific topic that is relevant to the reviewer and not all insights may be extracted and shared with other disciplines or departments within the same company or asset.

A new approach to extracting and utilizing data from the DDRs in a faster, less labor intensive, more comprehensive, and automated manner is desirable.

BRIEF DESCRIPTION OF THE DRAWINGS

For a better understanding of the aforementioned embodiments as well as additional embodiments thereof, reference should be made to the Detailed Description below, in conjunction with the following drawings in which like reference numerals refer to corresponding parts throughout the figures.

FIG. 1A illustrates a simplified schematic view of a survey operation performed by a survey tool at an oil field, in accordance to some embodiments.

FIG. 1B illustrates a simplified schematic view of a drilling operation performed by drilling tools, in accordance with some embodiments.

FIG. 1C illustrates a simplified schematic view of a production operation performed by a production tool, in accordance with some embodiments.

SUMMARY

Figure 2:
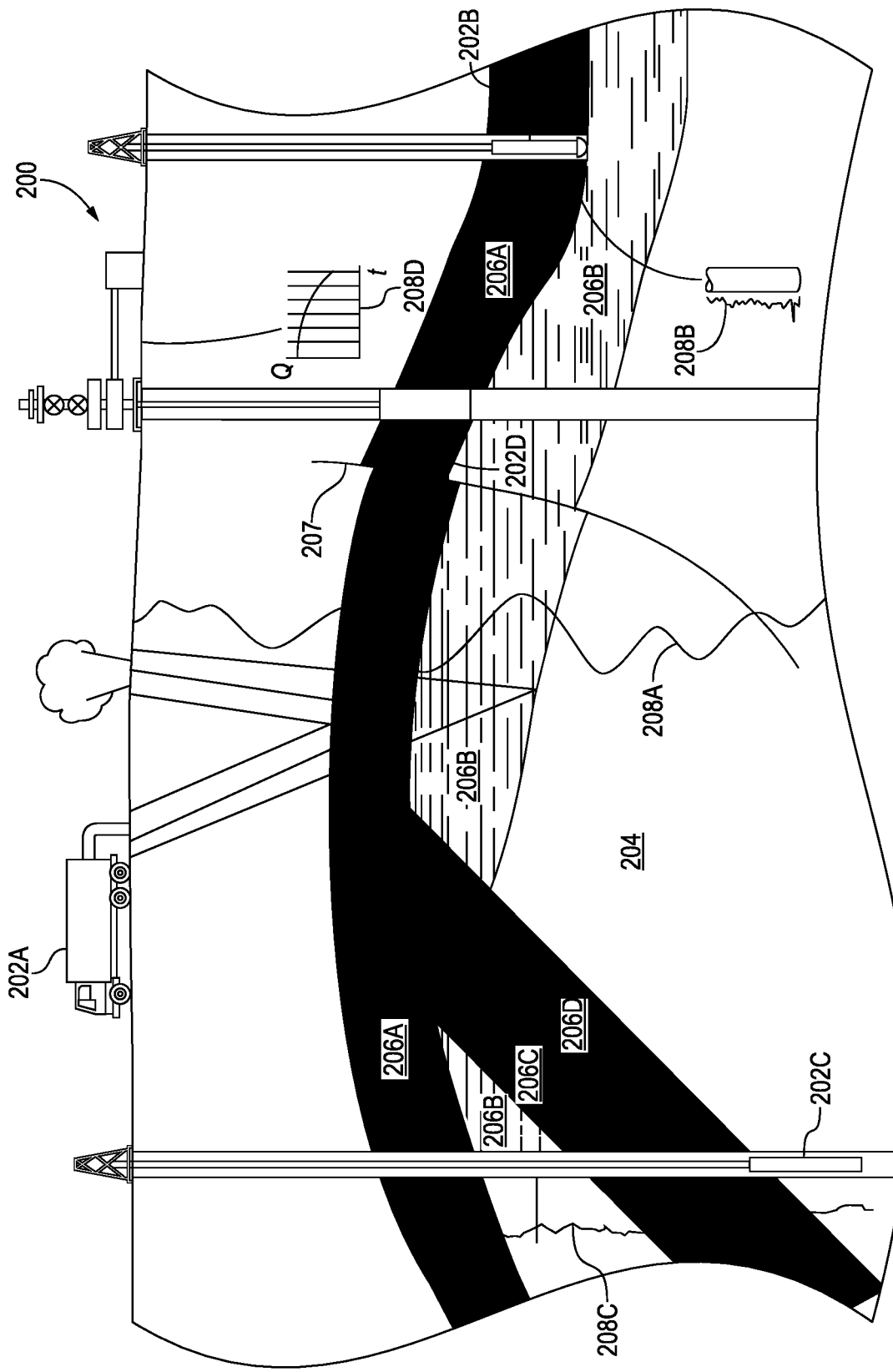
FIG. 2 illustrates a schematic view, partially in cross section, of an oilfield, in accordance with some embodiments.

According to one aspect of the subject matter described in this disclosure, a method for extracting information regarding a drill site is provided. The method includes forming one or more documents having one or more raw comments regarding a well site, and extracting raw data from one or more documents regarding the well site to produce extracted raw data. The raw data includes one or more comments directed to operational details of the wellsite. Also, the method includes pre-processing the extracted raw data by removing ambiguity, artifacts, and/or formatting errors from the one or more raw comments to produce pre-processed data. The method includes extracting topics data from the pre-processed data using a natural language processing (NLP) algorithm to produce extracted topics data. The NLP algorithm includes a first NLP model for extracting topics data. Moreover, the method includes extracting measurement data from the pre-processed data using the NLP algorithm to produce extracted measurement data. The NLP algorithm includes a second NLP model for extracting measurement data. The extracted topics data and the extracted measurement data are aggregated to form a set of discrete data points, such as calibration points, per comment to produce aggregated data. Furthermore, the method includes identifying one or more discrete data points from the aggregated data, and presenting the results of the one or more discrete data points.

According to another aspect of the subject matter described in this disclosure, a system is provided that includes a processor, and one or more documents having one or more raw comments regarding a well site. The processor is configured to extract raw data from one or more documents regarding the well site to produce extracted raw data, and pre-process the extracted raw data by removing ambiguity, artifacts, and/or formatting errors from the one or more raw comments to produce pre-processed data. The raw data includes one or more comments directed to operational details of the wellsite. Also, the processor is configured to extract topics data from the pre-processed data using a natural language processing (NLP) algorithm to produce extracted topics data. The NLP algorithm includes a first NLP model for extracting the topics data. In addition, the processor is configured to extract measurement data from the pre-processed data using the NLP algorithm to produce extracted measurement data. The NLP algorithm includes a second NLP model for extracting the measurement data. Moreover, the processor is configured to aggregate the extracted topics data and the extracted measurement data to form a set of discrete data points, such as calibration points, per comment to produce aggregated data. Furthermore, the processor is configured to identify one or more discrete data points from the aggregated data, and present the results of the one or more discrete data points.

According to another aspect of the subject matter described in this disclosure, a method for extracting information from a daily drill report (DDR) is provided. The method includes extracting raw data from the DDR regarding a well site to produce extracted raw data, and iterating through the one or more raw comments and converting the one or more raw comments into cleaned comment tokens. The raw data includes one or more comments directed to operational details of the wellsite. Also, the method includes iterating through the cleaned comment tokens and normalizing the clean comment tokens, and reducing or transforming the normalized comment tokens to form pre-processed data, and extracting topics data from the pre-processed data using a natural language processing (NLP) algorithm to produce extracted topics data. The NLP algorithm includes a first NLP model for extracting topics data. Moreover, the method includes extracting measurement data from the pre-processed data using the NLP algorithm to produce extracted measurement data. The NLP algorithm includes a second NLP model for extracting measurement data. In addition, the method includes aggregating the extracted topics data and the extracted measurement data to form a set of discrete data points, such as calibration points, per comment to produce aggregated data. Furthermore, the method includes identifying one or more discrete data points from the aggregated data, and presenting the results of the one or more discrete data points.

Additional features and advantages of the present disclosure are described in, and will be apparent from, the detailed description of this disclosure.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

The computing systems, methods, processing procedures, techniques and workflows disclosed herein are more efficient and/or effective methods for identifying, isolating, transforming, and/or processing various aspects of data that is collected from a subsurface region or other multi-dimensional space to enhance flow simulation prediction accuracy. The described methods and apparatus provide a new technological solution to the petroleum engineering problems described herein. Embodiments are directed to new and specialized processing apparatus and methods of using the same. Integrity determination according to the present application implicates a new processing approach (e.g., hardware, special purpose processors, and specially programmed general purpose processors) because such analyses are too complex and cannot be done by a person in the time available or at all. Thus, the apparatus and method of the claims are directed to tangible implementations or solutions to a specific technological problem in the seismic field.

Quite often, in addition to drilling events or activities in existing wells, a reviewer might be interested in quantitative information that can help plan the next well. Examples include leak-off test values at the casing shoe, the mud weight as a function of the depth, the depth in which gas kicks were observed and their associated mud weight values, and the depth in which mud losses were observed and their associated values. Such data may be used to build a calibrated mechanical earth model (often referred to as geomechanics models), and when combined with log data, may be used to automatically generate pre-drill mechanical earth models which may result in shorter planning phases and better-informed and data-driven decisions.

Free text daily drilling reports (DDRs) may exist in abundance but may rarely be used to improve drilling efficiency or to shorten the time it takes to plan new wells. Going through unstructured data to evaluate a problem or improve future operations may usually be done by engineers who manually screen the DDRs to extract relevant information. When the volume of data is large, time and resources may be a constraint, and such reviews may be limited to a reduced number of wells, if done at all.

When building geomechanics models, project planners can often spend up to 60% to 80% of the project time collecting data, and although this amount may vary between companies and teams, the time spent may be too high and may either lead to a reduction in application of data and insights or may render workflows inefficient.

Thus, it may be desirable to automate the data extraction process using statistical models based on machine learning and/or to provide a way for the system to be augmented by user feedback. This may allow the user to utilize data or insights without compromises and may support efficient exploration and production (E&P) workflows.

The present disclosure is directed to an automatic method for performing report reviews and extracting information, e.g., by using machine learning algorithms (ML) and/or natural language processing (NLP) technologies. The techniques described herein may be used to build an adaptive workflow to support reviews of reports in different file formats including PDF, Images, Word, Excel, CSV, and wellsite information transfer standard markup language (WITSML), and to extract quantitative information to facilitate automation of end-to-end workflows. The techniques may provide more extensive information at field scale rather than for a few wells only compared to the existing techniques.

In an embodiment, the principles described herein may be utilized in multiple applications, from basic investigations related to operational problems to the manual or automated calibration of sophisticated drilling optimization models (e.g., three-dimensional (3D) geomechanics and predictive drilling using artificial intelligence (AI)). The principles described herein may also facilitate the analysis of a variety of problems linked to multiple domains such as well engineering, drilling, completion, production, workover, geology, and reservoir, and help improve the efficiency of operations. For example, automatic extraction of drilling events from drilling reports may be used for offset well analysis when planning a well. This may ensure that knowledge from drilled wells is captured to improve the wells to be drilled in the future. Automatic extraction of calibration data from drilling reports may be used for the calibration of geomechanical stress models that can be used to improve further well planning and operations. The methods described herein may be used in extraction of calibration data from geomechanics studies or similar documents, or in using extracted knowledge to create regional maps of uncertainties or risks, e.g., in association with geological information.

The present disclosure is directed to improved systems and methods for extracting events and information from different types of reports by text mining unstructured text in, e.g., exploration and production workflows. The present disclosure describes a new system and method that extracts information including events with contextual information using sequence mining from text comments in historic DDRs. The extracted information may represent discrete data points, such as calibration points for geomechanical post-drill analyses that may be useful to generate drilling risks and maps to improve well design or mitigation strategies in the same field or area. The principles disclosed herein may be combined with a computing system to provide an integrated and practical application to improve data extraction and utilization.

An advantage of the present disclosure is an automated solution that improves efficiency when generating and/or calibrating geomechanical stress models. For example, the techniques in the present disclosure may reduce the time spent in finding data in an existing report, and/or may provide calibration data to facilitate automation of end-to-end workflows. Another advantage of the present disclosure is an automated solution that provides events for offset well analysis from drilling reports in a faster and more extensive manner.

FIGS. 1A-1C illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations 118 is received by sensors, such as geophone-receivers 118, situated on the earth's surface. The data received 120 is provided as input data to a computer 122a of the seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. The drilling tools are advanced into subterranean formations 102 to reach reservoir 104. Each well may target one or more reservoirs. The drilling tools may be adapted for measuring downhole properties using logging while drilling tools. The logging while drilling tools may also be adapted for taking core sample 133 as shown.

The drilling tool 106b may include downhole sensor S adapted to perform logging while drilling (LWD) data collection. The sensor S may be any type of sensor.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

In some embodiments, sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. In some embodiments, sensors (S) may also be positioned in one or more locations in the wellbore 136.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is configured to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

The data gathered by sensors (S) may be collected by surface unit 134 and/or other data collection sources for analysis or other processing. An example of the further processing is the generation of a grid for use in the computation of a juxtaposition diagram as discussed below. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller.

FIG. 1C illustrates a production operation being performed by production tool 106c deployed by rig 128 having a Christmas tree valve arrangement into completed wellbore 136 for drawing fluid from the downhole reservoirs into rig 128. The fluid flows from reservoir 104 through perforations in the casing (not shown) and into production tool 106c in wellbore 136 and to rig 128 via gathering network 146.

In some embodiments, sensors (S), such as gauges, may be positioned about oilfield 100 to collect data relating to various field operations as described previously. As shown, the sensors (S) may be positioned in production tool 106c or rig 128.

While FIGS. 1B-1C illustrate tools used to measure properties of an oilfield, it will be appreciated that various measurement tools capable of sensing parameters, such as seismic two-way travel time, density, resistivity, production rate, etc., of the subterranean formation and/or its geological formations may be used. As an example, wireline tools may be used to obtain measurement information related to casing attributes. The wireline tool may include a sonic or ultrasonic transducer to provide measurements on casing geometry. The casing geometry information may also be provided by finger caliper sensors that may be included on the wireline tool. Various sensors may be located at various positions along the wellbore and/or the monitoring tools to collect and/or monitor the desired data. Other sources of data may also be provided from offsite locations.

The field configurations of FIGS. 1A-1C are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites. An example of processing of data collected by the sensors is the generation of a grid for use in the computation of a juxtaposition diagram as discussed below.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1C, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that provides a resistivity or other measurement of the formation at various depths.

A production decline curve or graph 208d is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, for example below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated to form DDRs or other reports for assessing a drill site.

In some embodiments, DDRs may include the a well's name, area and location (by latitude and longitude) (county and state) of the well, the well control number, rig contractor name and rig number, spud and rig release dates, weather and temperature, road condition and hole condition, and name of the person submitting the report.

In some embodiments, DDRs may include bits used (with size and serial numbers), depths (kelly bushing depth, ground elevation, drilling depth, drilling depth progress, water depth), drilling fluid losses and lost circulation, estimated costs (usually a separate document), fishing and side tracking, mud engineer's lithology of formations drilled and hydrocarbons observed, daily drilling issues, tubulars (casing and tubing joints and footages) run and cement used, vendors and their services, well bore survey results, work summary, work performed and planned.

In some embodiments, DDRs may include the hourly breakdown duration of single operations with codes that allow an instant view, understanding and summary of each phase, for example, rig up and rig down hours, drilling tangent (vertical), curve drilling (to change the direction of the drilling from vertical to horizontal) and lateral drilling (for horizontal wells), circulating the well, conditioning the mud, reaming the hole for safety to prevent stuck pipe, running casing, waiting on cement, nipple up and testing BOP's, trips in and out of the hole and surveys.

Figure 3:
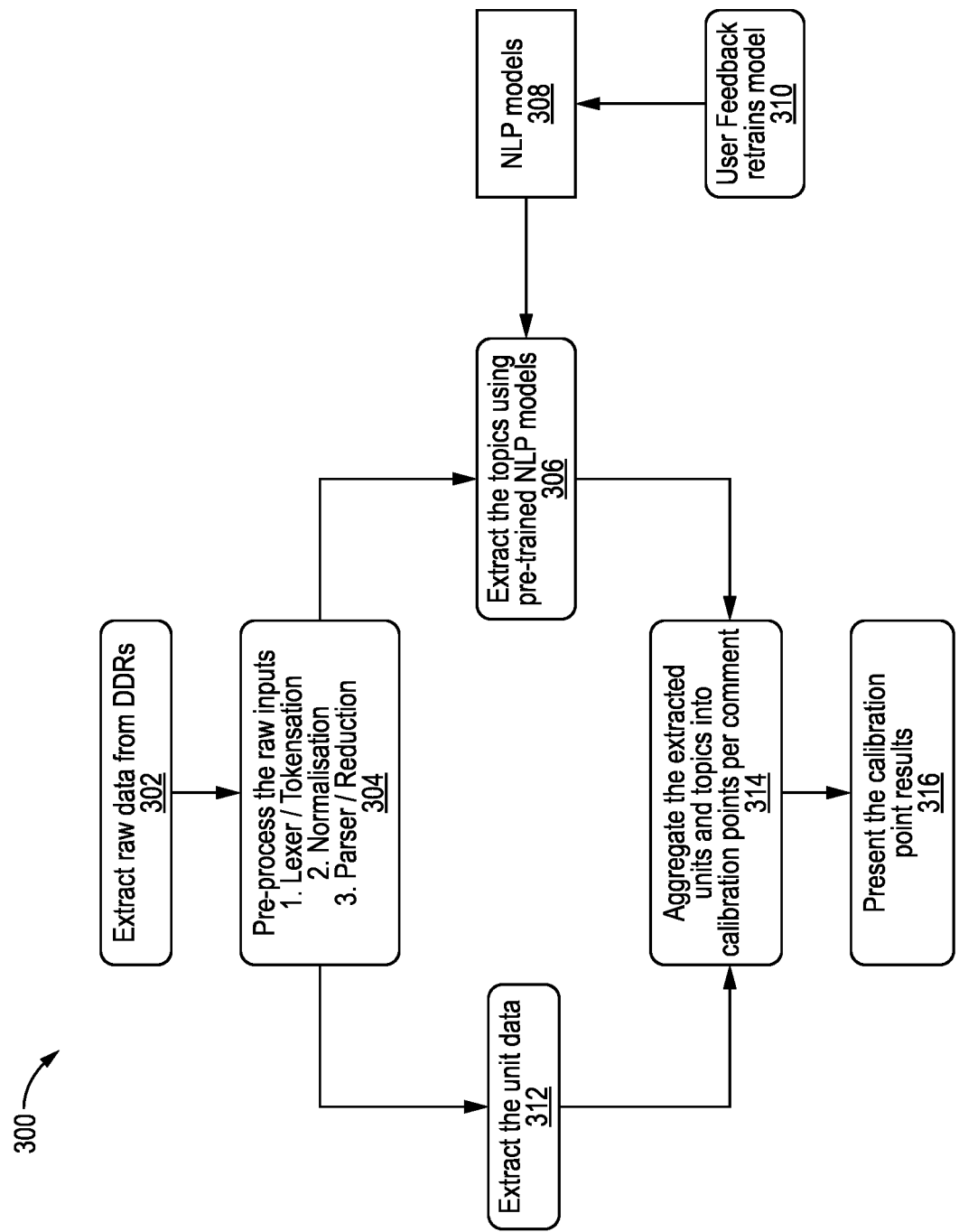
FIG. 3 illustrates a workflow of a method for extracting information from a DDR report, in accordance with some embodiments.

FIG. 3 shows a process flow of a method 300 for extracting information from a DDR report. The method 300 begins with a data ingestion step where raw data is extracted from a document or report, as shown in step 302. The document may be a DDR in various forms (e.g., portable document format (PDF), comma-separated values (CSV), wellsite information transfer standard markup language (WITSML), and text, scanned images). The DDR may include a multitude of unstructured raw data, some of which may be raw comments directed to specific operational details of the wellsite. This data ingestion step 302 may include reading unstructured DDRs and/or extracting structured entities. Optical character recognition (OCR) technology may be applied to obtain free text from non-digital support material. Raw comments may be the main extraction focus, but any other additional metadata such as depth, time, and well name in the DDR may also be extracted and used for quality control and/or data labelling purposes. In an embodiment, the extracted raw comments and/or metadata may be stored in a database for convenience. In some embodiments, the raw comments and/or metadata may include unstructured text or numerical data.

The method 300 may include pre-processing the extracted raw data, as shown in step 304. Data pre-processing may include converting a raw comment from a DDR into a defined comment format for subsequent steps. Within the pre-processing step 304, the raw comments may go through one or more stages such as a cleaning and lexical analysis stage, a normalization stage, and a parser stage, which may be a loose abstraction of front-end compiler design. The cleaning and lexical analysis stage may iterate through a raw comment and convert the raw comment into clean comment tokens removing ambiguity, artifacts, and/or formatting errors from the raw comment. The normalization stage may iterate through the clean comment tokens and may normalize them based on pre-defined domain knowledge inputs and/or an NLP model. The parser stage may reduce or transform the normalized comment tokens based on pre-defined domain knowledge inputs and/or using semantic analysis considering the contextual information of the comment tokens in and across comment sentences.

The method 300 may include extracting, by a natural language processing (NPL) algorithm having a pre-trained NLP model, topics data from the pre-processed data, as shown in step 306. Topics may represent drilling events. Topics data extraction may associate symptoms and/or events to each formatted comment in the DDRs. At this step, a variety of natural language learning processing (NLP) models 308 may be utilized where each may contribute with varying weights to a confidence metric for each event and comment pair. For example, layered keyword extraction may be used to provide a baseline confidence metric of the presence of the symptoms and events. Deep learning methods (e.g., those using neural networks such as convolutional neural networks (CNN) and long short-term memory (LSTM) and named-entity recognition) and/or unsupervised learning methods (e.g., those using topic modelling such as latent dirichlet allocation (LDA)) may be used to further augment the confidence metric. Entities extracted from the process of named-entity recognition may be verified by an entity linking system. Additionally or alternatively, other labels or actions may be extracted. If tracked sequentially across DDR comments, a data fingerprint may be formed for the topic labels (e.g., Symptoms->Events->Actions) following an instance where a calibration point can be extracted or augmenting the confidence of the occurrence of an event.

The method 300 may further include extracting unit or measurement data from the pre-processed data, as shown in step 312. Measurement data extraction may include iterating through the input comments and/or searching for unit tokens defined in the pre-processing step. Semantic analysis on the unit tokens may be performed at this step to associate units to their numerical values and/or semantic labels. In an embodiment, the NLP algorithm may use an NLP model to extract measurement data that is the same or different from the NLP models used in step 306. In some embodiments, the NLP model used to extract measurement data may include one or more NLP models.

The method 300 may then proceed with identifying a discrete data point (in this example, a calibration point) based on at least one of the topics data or the measurement data, as shown in step 314. The extracted topics of step 306 and the extracted unit data of step 312 are aggregated into calibration points per comment. A calibration point may be identified by cross-referencing extracted topics and measurements. Machine arguing (e.g., Abstract Argumentation for Case-Based Reasoning) may be utilized for the cross-referencing process to verify the calibration point with regards to the domain argument cases (defined by the subject matter expert) and the transformed entities (found in the processed text). The transformed entities may be extracted feature entities converted into a subject, object and relation schema. The verified calibration point may be used in a subsequent workflow as a calibration for various purposes, e.g., as a calibration for a next well to drill, to help calibrate a stress analysis, and/or to improve a geomechanics model or machine learning model. In some embodiments, a calibration point may be identified when a kick event occurred while drilling with a given mud weight at a given depth (e.g., a kick (or gas influx) at a depth of 6532 ft using a mud weight of 9 ppg; or gains of 1 $m^3$ at a depth 6532 ft). This calibration point may be used as a calibration point in subsequent "pore pressure" workflows.

In some embodiments, the calibration point may be a combination of the topics and measurement data, for example, a combination of knowing that loss of mud happened at a particular depth and with a mud weight such as in a mud loss event of downhole losses of 1 $m^3$ at 2345 ft with mud weight of 1.3 g/cc. This calibration point may be used as a calibration for fracture pressure or minimum stress in a subsequent workflow.

Another example of a calibration point may be a value(s) in a report generated by a leak-off test, such as a leak-off test at a depth of 4532 ft with a maximum pressure of 3400 psi. A leak-off test may be a test carried out to determine the pressure of fracture or the strength of an open formation after drilling below a new casing shoe. Such a calibration point may be used in subsequent workflows as a calibration for fracture pressure or minimum stress. A similar calibration point may be from a formation integrity test (FIT) or instantaneous shut-in pressure (ISIP). Yet another example of a calibration point may be from formation pressure measurements using wireline or logging while drilling (LWD) tools such as a formation pressure of 2300 psi measured at 5342 ft. This measurement or calibration point may be used as a calibration point in subsequent pore pressure workflows.

Afterwards, the calibration point results are presented for generating and/or calibrating geomechanical stress models, as shown in step 316. For example, the techniques in the present disclosure may reduce the time spent in finding data in an existing report, and/or may provide calibration data to facilitate automation of end-to-end workflows. In some embodiments, the results are sent via email to one or more users.

In another embodiment, extracted metadata may also be used besides the extracted topics and measurements to aggregate the result into a calibration point(s) for each well.

In some embodiments, user feedback input 310 may be used to retrain the one or more of the NLP models 308, and the NLP model used for measurement data extraction. After calibration data or calibration points have been extracted, the system performance may be augmented by including a feedback loop where users can provide quality feedback highlighting false positive or false negative cases in order to re-train the NLP model. A domain knowledge step may populate various domain knowledge inputs, e.g., to the rest of the steps of the method. Examples of various domain knowledge inputs include topic labels, acronym expansions, units, argumentation domain cases and pre-processing lists. The inputs may be initially extracted from raw sources but can be continuously updated by a user(s) for each dataset parsed.

In some embodiments, the NLP model may identify the syntactic structure of a text and the dependency relationships between words, represented on a diagram called a parse tree.

In some embodiments, the NLP model may use sentence tokenization to split sentences within a text, or word tokenization to split words within a sentence.

In some embodiments, the NLP model may be used by machine learning algorithms to implement text classification models for organizing unstructured text into predefined categories (tags). In some embodiments, the text classification models are formed using naives Bayes algorithm. In some embodiments, the text classification models are formed using named entity recognition which are then verified using named entity linking.

In some embodiments, the NLP model may be formed using support vector machine algorithms that implement supervised classification models aimed to predict the category of a piece of text based on a set of manually tagged training examples.

In some embodiments, the NLP model may be formed using a text extraction algorithm for extracting specific pieces of data from a text. In some embodiments, the text extraction algorithm may use a statistical approach determining how relevant a word is within a text in a collection of documents, and is often used to extract relevant keywords from text. In some embodiments, the text extraction may check if a string contains a determined search pattern, and is often used for extracting keywords and entities from text. In some embodiments, the text extraction may learn patterns and extract data by assigning a weight to a set of features in a sentence. In some embodiments, the text extraction algorithm may use a list of stopwords and phrase delimiters to identify relevant words or phrases within a text.

Figure 4:
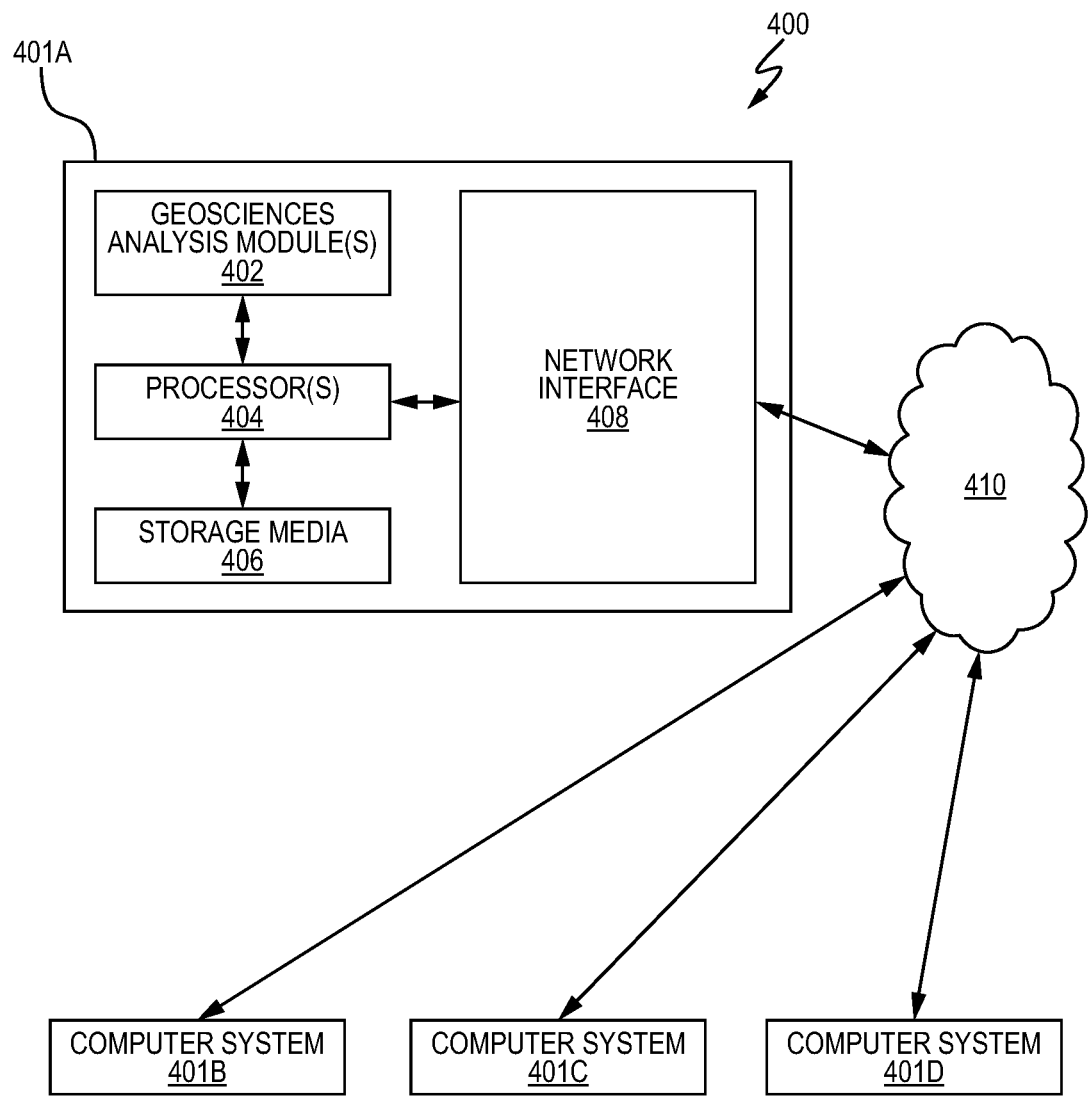
FIG. 4 depicts an example of a computing system for carrying out some of the methods of the present disclosure, in accordance with some embodiments.

FIG. 4 depicts an example computing system 400 in accordance with carrying out some of the methods of the present disclosure. For example, the computing system 400 may perform a method for extracting information that includes extracting raw data from a document, pre-processing the extracted raw data, and extracting, by a pre-trained NLP technologies model, topics data from the pre-processed data. The computing system 400 may further perform the method of extracting measurement data from the pre-processed data and identifying a calibration point based on at least one of the topics data or the measurement data, where user feedback input is used to retrain the NLP model.

The computing system 400 can be an individual computer system 401A or an arrangement of distributed computer systems. The computer system 401A includes one or more geosciences analysis modules 402 that are configured to perform various tasks according to some embodiments, such as one or more methods disclosed herein. To perform these various tasks, geosciences analysis module 402 executes independently, or in coordination with, one or more processors 404, which is (or are) connected to one or more storage media 406. The processor(s) 404 is (or are) also connected to a network interface 408 to allow the computer system 401A to communicate over a data network 410 with one or more additional computer systems and/or computing systems, such as 401B, 401C, and/or 401D (note that computer systems 401B, 401C and/or 401D may or may not share the same architecture as computer system 401A, and may be located in different physical locations, e.g., computer systems 401A and 401B may be on a ship underway on the ocean, while in communication with one or more computer systems such as 401C and/or 401D that are located in one or more data centers on shore, other ships, and/or located in varying countries on different continents). Note that data network 410 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 406 can be implemented as one or more computer-readable or machine-readable storage media. Note that while in the example embodiment of FIG. 4 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that the instructions or methods discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

It should be appreciated that computer system 401A is one example of a computing system, and that computer system 401A may have more or fewer components than shown, may combine additional components not depicted in the example embodiment of FIG. 4, and/or computer system 401A may have a different configuration or arrangement of the components depicted in FIG. 4. The various components shown in FIG. 4 may be implemented in hardware, software, or a combination of both, hardware and software, including one or more signal processing and/or application specific integrated circuits.

It should also be appreciated that while no user input/output peripherals are illustrated with respect to computer systems 401A, 401B, 401C, and 401D, many embodiments of computing system 400 include computing systems with keyboards, touch screens, displays, etc. Some computing systems in use in computing system 1100 may be desktop workstations, laptops, tablet computers, smartphones, server computers, etc.

Further, the steps in the processing methods described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are included within the scope of protection of the disclosure.

In some embodiments, a computing system is provided that comprises at least one processor, at least one memory, and one or more programs stored in the at least one memory, wherein the programs comprise instructions, which when executed by the at least one processor, are configured to perform any method disclosed herein.

In some embodiments, a computer readable storage medium is provided, which has stored therein one or more programs, the one or more programs comprising instructions, which when executed by a processor, cause the processor to perform any method disclosed herein.

In some embodiments, a computing system is provided that comprises at least one processor, at least one memory, and one or more programs stored in the at least one memory; and means for performing any method disclosed herein.

In some embodiments, an information processing apparatus for use in a computing system is provided, and that includes means for performing any method disclosed herein.

In some embodiments, a graphics processing unit is provided, and that includes means for performing any method disclosed herein.

These systems, methods, processing procedures, techniques, and workflows increase effectiveness and efficiency. Such systems, methods, processing procedures, techniques, and workflows may complement or replace conventional methods for identifying, isolating, transforming, and/or processing various aspects of data that is collected from a subsurface region or other multi-dimensional space to enhance flow simulation prediction accuracy.

As can be appreciated in view of the foregoing, the present disclosure is directed to analyzing drill site data by implementing a tool that can extract information including events with contextual information using sequence mining from text comments in historic DDRs. The extracted information may represent discrete data points, such as calibration points for geomechanical post-drill analyses that may be useful to generate drilling risks and maps to improve well design or mitigation strategies in the same field or area. Also, the automatic extraction of drilling events from drilling reports may be used for offset well analysis when planning a well. This may ensure that knowledge from drilled wells is captured to improve the wells to be drilled in the future. Automatic extraction of calibration data from drilling reports may be used for the calibration of geomechanical stress models that can be used to improve further well planning and operations. This approach can cut the time planners spend collecting data allowing more time to use the data to devise various drill site models and improve workflow efficiency.

While various embodiments in accordance with the disclosed principles have been described above, it should be understood that they have been presented by way of example only and are not limiting.

Furthermore, the above advantages and features are provided in described embodiments, but shall not limit the application of such issued claims to processes and structures accomplishing any or all of the above advantages.

The invention claimed is:

1. A method for extracting information regarding a drill site, the method comprising:
    forming one or more documents having raw data regarding a well site, wherein the raw data includes one or more raw comments directed to operational details of the well site;
    extracting the raw data from the one or more documents regarding the well site to produce extracted raw data;
    pre-processing the extracted raw data by removing one or more of ambiguity, artifacts, and formatting errors from the one or more raw comments to produce pre-processed data;
    extracting topics data from the pre-processed data using a natural language processing (NLP) algorithm to produce extracted topics data, the NLP algorithm including a first NLP model for extracting the topics data;
    extracting measurement data from the pre-processed data using the NLP algorithm to produce extracted measurement data, the NLP algorithm including a second NLP model for extracting the measurement data;
    aggregating the extracted topics data and the extracted measurement data to form a set of discrete data points per comment to produce aggregated data;
    identifying one or more discrete data points from the aggregated data; and
    applying the one or more discrete data points as calibration points for geomechanical post drill analysis used to generate drilling risks and maps to improve well design or mitigation strategies in a field or area.

2. The method of claim 1, wherein the one or more documents are daily drilling reports and the set of discrete data points is a set of calibration points.

3. The method of claim 1, wherein the pre-processing step comprises iterating through the one or more raw comments and converting the one or more raw comments into cleaned comment tokens.

4. The method of claim 3, wherein the pre-processing step comprises iterating through the cleaned comment tokens, and further wherein the NLP algorithm normalizes the cleaned comment tokens based on pre-defined domain knowledge inputs.

5. The method of claim 4, wherein the pre-processing step comprises reducing or transforming the normalized cleaned comment tokens based on the pre-defined domain knowledge inputs and/or using a semantic analysis.

6. The method of claim 1, wherein the first NLP model comprises two or more NLP models for extracting the topics data.

7. The method of claim 6, wherein the second NLP model comprises two or more NLP models for extracting the measurement data.

8. The method of claim 1, further comprising retraining the first NLP model or the second NLP model with user feedback.

9. A system comprising:
a processor; and
one or more documents having raw data regarding a well site, the raw data having one or more raw comments directed to operational details of the well site, wherein the processor is configured to:
extract the raw data from the one or more documents regarding the well site to produce extracted raw data;
pre-process the extracted raw data by removing one or more of ambiguity, artifacts, and formatting errors from the one or more raw comments to produce pre-processed data;
extract topics data from the pre-processed data using a natural language processing (NLP) algorithm to produce extracted topics data, the NLP algorithm including a first NLP model for extracting the topics data;
extract measurement data from the pre-processed data using the NLP algorithm to produce extracted measurement data, the NLP algorithm including a second NLP model for extracting the measurement data;
aggregate the extracted topics data and the extracted measurement data to form a set of discrete data points per comment to produce aggregated data;
identify one or more discrete data points from the aggregated data; and
apply the results of the one or more discrete data points as calibration points for geomechanical post drill analysis used to generate drilling risks and maps to improve well design or mitigation strategies in a field or area.

10. The system of claim 9, wherein the one or more documents are daily drilling reports and the set of discrete data points is a set of calibration points.

11. The system of claim 9, wherein the processor is configured to iterate through the one or more raw comments and convert the one or more raw comments into cleaned comment tokens.

12. The system of claim 11, wherein the processor is configured to iterate through the cleaned comment tokens and further wherein the NLP algorithm normalizes the cleaned comment tokens based on pre-defined domain knowledge inputs.

13. The system of claim 12, wherein the processor is configured to reduce or transform the normalized cleaned comment tokens based on the pre-defined domain knowledge inputs and/or using a semantic analysis.

14. The system of claim 9, wherein the first NLP model comprises two or more NLP models for extracting the topics data.

15. The system of claim 14, wherein the second NLP model comprises two or more NLP models for extracting the measurement data.

16. The system of claim 9, further comprising retraining the first NLP model or the second NLP model with user feedback.

17. A method for extracting information from a daily drilling report (DDR), the method comprising:
extracting raw data from the DDR regarding a well site, wherein the raw data includes one or more raw comments directed to operational details of the well site;
iterating through the one or more raw comments and converting the one or more raw comments into cleaned comment tokens;
iterating through the cleaned comment tokens and normalizing the cleaned comment tokens;
reducing or transforming the normalized cleaned comment tokens to form pre- processed data;
extracting topics data from the pre-processed data using a natural language processing (NLP) algorithm to produce extracted topics data, the NLP algorithm including a first NLP model for extracting the topics data;
extracting measurement data from the pre-processed data using the NLP algorithm to produce extracted measurement data, the NLP algorithm including a second NLP model for extracting the measurement data;
aggregating the extracted topics data and the extracted measurement data to form a set of discrete data points per comment to produce aggregated data, the set of discrete data points including a set of calibration points;
identifying one or more calibration points from the aggregated data; and
applying the results of the one or more calibration points as calibration points for geomechanical post drill analysis used to generate drilling risks and maps to improve well design or mitigation strategies in a field or area.

18. The method of claim 17, wherein the first NLP model comprises two or more NLP models for extracting the topics data.

19. The method of claim 18, wherein the second NLP model comprises two or more NLP models for extracting the measurement data.

20. The method of claim 17, further comprising retraining the first NLP model or the second NLP model with user feedback.

* * * * *